United States Patent
Bekara et al.

(10) Patent No.: US 12,313,802 B2
(45) Date of Patent: May 27, 2025

(54) SEPARATION OF BLENDED SEISMIC SURVEY DATA

(71) Applicant: PGS Geophysical AS, Oslo (NO)

(72) Inventors: Maiza Bekara, Weybridge (GB); Lian Duan, Weybridge (GB)

(73) Assignee: PGS Geophysical AS, Oslo (NO)

( * ) Notice: Subject to any disclaimer, the term of this patent is extended or adjusted under 35 U.S.C. 154(b) by 380 days.

(21) Appl. No.: 18/081,502

(22) Filed: Dec. 14, 2022

(65) Prior Publication Data

US 2023/0117321 A1 Apr. 20, 2023

Related U.S. Application Data

(63) Continuation of application No. 16/533,173, filed on Aug. 6, 2019, now Pat. No. 11,567,226.

(60) Provisional application No. 62/789,816, filed on Jan. 8, 2019, provisional application No. 62/724,101, filed on Aug. 29, 2018.

(51) Int. Cl.
*G01V 1/36* (2006.01)
*G01V 1/24* (2006.01)
*G01V 1/38* (2006.01)

(52) U.S. Cl.
CPC ............ *G01V 1/3808* (2013.01); *G01V 1/247* (2013.01); *G01V 1/36* (2013.01); *G01V 2210/3246* (2013.01)

(58) Field of Classification Search
CPC ........ G01V 1/3808; G01V 1/247; G01V 1/36; G01V 2210/3246
See application file for complete search history.

(56) References Cited

U.S. PATENT DOCUMENTS

| | | | |
|---|---|---|---|
| 6,906,981 B2 | 6/2005 | Vaage | |
| 9,945,972 B2 | 4/2018 | Baardman et al. | |
| 2010/0039894 A1 | 2/2010 | Abma | |
| 2013/0121109 A1 * | 5/2013 | Baardman | G01V 1/36 367/24 |

(Continued)

FOREIGN PATENT DOCUMENTS

| | | | | |
|---|---|---|---|---|
| CA | 2731985 A1 * | 2/2010 | ............... | G01V 1/00 |
| GB | 2309082 A * | 7/1997 | ............. | G01V 1/364 |

(Continued)

OTHER PUBLICATIONS

International Search Report and Written Opinion in PCT Appl. No. PCT/EP2019/073116 mailed Dec. 9, 2019 (19 pages).

(Continued)

*Primary Examiner* — Krystine E Breier

(57) ABSTRACT

Techniques are disclosed relating to deblending of sources in multi-source geophysical survey data, including marine or land-based data. Multiple sets of deblended receiver traces are generated by iteratively applying a coherency filter to estimated sets of deblended receiver traces and updating a residual until a termination condition is reached. In some embodiments, applying the coherency filter during a current iteration may include determining coefficients of the coherency filter based on estimated sets of deblended receiver traces from an immediately prior iteration. In further embodiments, applying the coherency filter may include applying a 3D projection filter, such as an fxy projection filter.

23 Claims, 15 Drawing Sheets

(56) References Cited

U.S. PATENT DOCUMENTS

| | | | | |
|---|---|---|---|---|
| 2015/0241587 | A1* | 8/2015 | Baardman | G01V 1/364 702/17 |
| 2015/0293249 | A1* | 10/2015 | Peng | G01V 1/364 702/16 |
| 2016/0070011 | A1* | 3/2016 | Muijzert | G01V 1/36 367/14 |
| 2016/0077231 | A1* | 3/2016 | Rohnke | G01V 1/364 367/7 |
| 2020/0073001 | A1 | 3/2020 | Bekara et al. | |

FOREIGN PATENT DOCUMENTS

| | | | | |
|---|---|---|---|---|
| WO | WO-2015063595 | A1 * | 5/2015 | G01V 1/282 |
| WO | WO-2016110738 | A1 * | 7/2016 | G01V 1/366 |

OTHER PUBLICATIONS

Chen, et al., "Making f-x Projection Filters Robust to Erratic Noise", SEG Technical Program Expanded Abstracts, Aug. 5, 2014, pp. 4371-4375.

Long, "Source and Streamer Towing Strategies for Improved Efficiency, Spatial Sampling and Near Offset Coverage", Special Topic: Marine Seismic, First Break, vol. 35, Nov. 2017, pp. 71-74.

Duan, et al., "A Practical Method for Multi-Source Deblending Using Spatio-Temporal Compressive Sensing", LRDeblendFX_v08, 79th EAGE Conference & Exhibition 2017, Jun. 12-15, 2017, 4 pages.

Chen, et al., "Making f-x Projection Filters Robust to Erratic Noise", SEG Denver 2014 Annual Meeting; https://library.seg.org/doi/abs/10.1190/segam2014-0893.1, pp. 4371-4375.

Sacchi, et al., "FX ARMA Filters", SEG 2000 Expanded Abstracts, 4 pages.

Baardman, et al., "Separating Sources in Maine Simultaneous Shooting Acquisition—Method & Applications", SEG Las Vegas 2012 Annual Meeting; http://dx.org/10.1190/segam2012-0992.1, 5 pages.

Soubaras, "Signal-Preserving Random Noise Attenuation by the F-X Projection", SP5.5, 1994 SEG Annual Meeting, Oct. 23-28, Los Angeles, California, pp. 1576-1579.

Soubaras, "3D Projection Filtering for Noise Attenuation and Interpolation", SEG 2000 Expanded Abstracts; http://library.seg.org/, 4 pages.

Examination Report in AU2019332894 dated Mar. 5, 2024.
Examination Report in GB2103928.4 dated Feb. 24, 2022.

\* cited by examiner

```
┌─────────────────────────────────────────────────────────────┐
│ Receive recorded data, where the recorded data includes     │
│ blended records of seismic data having overlapping energy   │
│ from different sources, where energy from one or more       │
│ secondary sources is incoherent in at least one domain      │
│ relative to a primary source                                │
│                          500                                │
└─────────────────────────────────────────────────────────────┘
                              │
                              ▼
┌─────────────────────────────────────────────────────────────┐
│ Align the recorded data to a primary source of the          │
│ plurality of sources to produce aligned recorded data that  │
│ includes the primary source and one or more secondary       │
│ sources of the plurality of sources                         │
│                          502                                │
└─────────────────────────────────────────────────────────────┘
                              │
                              ▼
┌─────────────────────────────────────────────────────────────┐
│ Generate an output deblended estimate for the primary       │
│ source based on an input deblended estimate for the         │◄── B
│ primary source and an input residual signal                 │
│                          504                                │
└─────────────────────────────────────────────────────────────┘
                              │
                              ▼
┌─────────────────────────────────────────────────────────────┐
│ Align the input residual signal to the one or more          │
│ secondary sources to produce one or more aligned versions   │
│ of the input residual signal that correspond respectively   │
│ to the one or more secondary sources                        │
│                          506                                │
└─────────────────────────────────────────────────────────────┘
                              │
                              ▼
┌─────────────────────────────────────────────────────────────┐
│ Apply a coherency filter to the one or more aligned         │
│ versions of the input residual signal and respective input  │
│ deblended estimates for the one or more secondary sources   │
│ to produce respective aligned output deblended estimates    │
│ for the one or more secondary sources                       │
│                          508                                │
└─────────────────────────────────────────────────────────────┘
                              │
                              ▼
                             (A)                           (B)
```

*FIG. 5A*

SEPARATION OF BLENDED SEISMIC SURVEY DATA

CROSS-REFERENCE TO RELATED APPLICATIONS

This application is a continuation of and claims priority to the filing date of U.S. patent application Ser. No. 16/533,173, filed on Aug. 6, 2019, which claims priority to the filing date of U.S. Provisional Patent Application No. 62/724,101, filed on Aug. 29, 2018, and of U.S. Provisional Patent Application No. 62/789,816, filed on Jan. 8, 2019. Each of the aforementioned applications is hereby incorporated by reference as if entirely set forth herein.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. In some surveys, a survey vessel may tow one or more sources (e.g., air guns, marine vibrators, etc.) and one or more streamers along which a number of sensors (e.g., hydrophones and/or geophones) are located.

One particular type of seismic survey involves continuously recording sensor data while multiple different seismic sources are actuated. Such multi-source surveys may offer various advantages over single-source surveys, such as the ability to collect a richer set of data per survey pass for essentially the same amount of time and effort as a single-source survey. When multiple sources are actuated so as to overlap one another in time, however, the reflected energy from these sources tends to overlap in the recorded data. That is, the resultant record reflects a blend of energy from different sources. In order to effectively analyze the resulting data, it is typically "deblended" in order to separate the contributions of the individual sources. Deblending, which may also be referred to as source separation, presents a significant computational challenge. Embodiments of this disclosure may be used to improve the effectiveness of deblending, as discussed below.

BRIEF DESCRIPTION OF THE DRAWINGS

FIGS. 5A-B show a flow chart that illustrates a method for producing an image of subsurface geological features based on the deblending procedure shown in FIG. 4.

DETAILED DESCRIPTION

Figure 1:
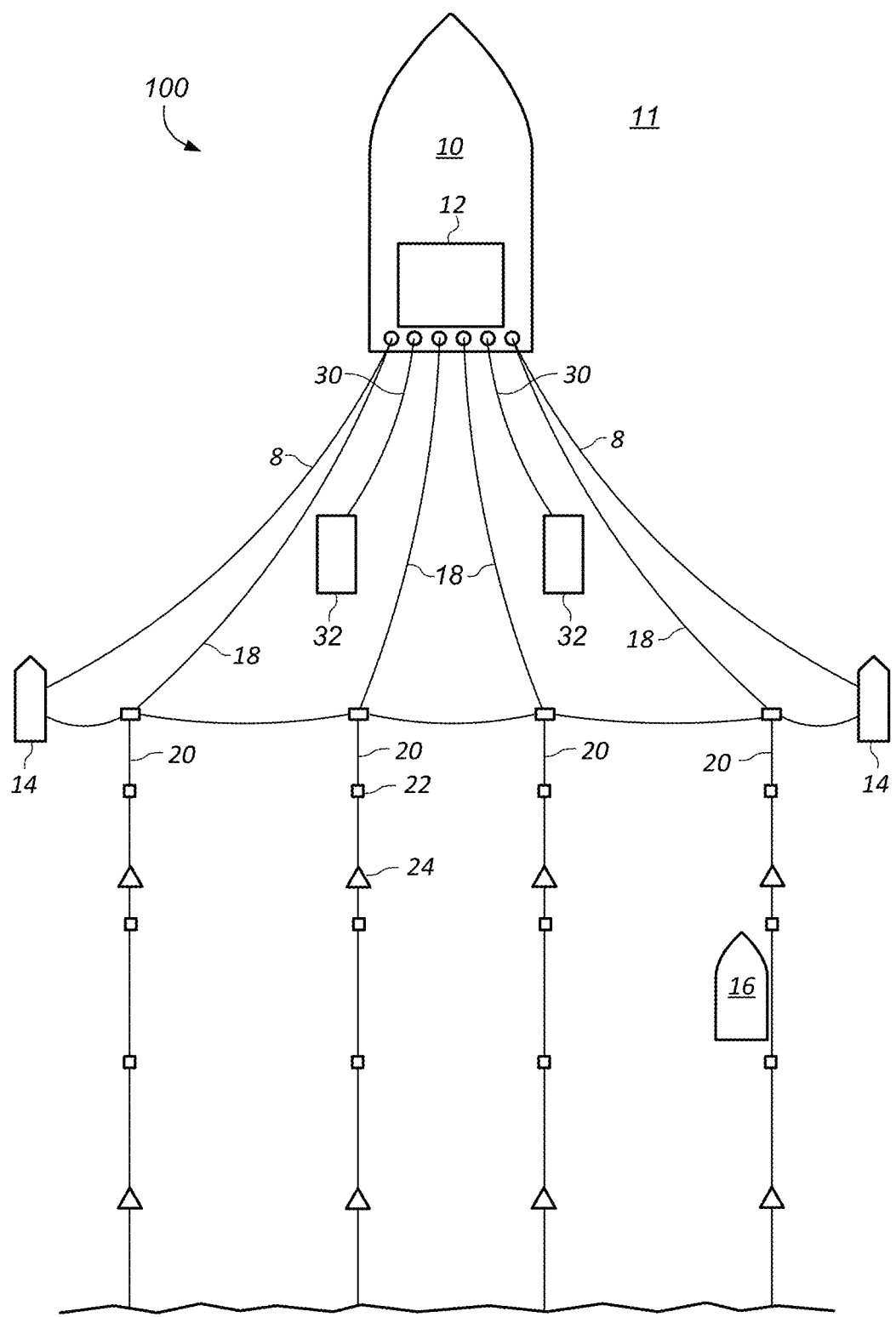
FIG. 1 shows an embodiment of a multi-source marine geophysical survey system.

This disclosure initially describes, with reference to FIG. 1, an overview of a multi-source geophysical survey system. It then describes techniques for deblending multi-source data with reference to FIGS. 2-7. Data visualizations that illustrate an application of the deblending techniques are discussed with respect to FIGS. 8-11. Finally, an example computing system is described with reference to FIG. 12.

Survey Overview

Referring to FIG. 1, an illustration of an embodiment of a multi-source geophysical survey system 100 is shown (not necessarily to scale). System 100 includes survey vessel 10 (also referred to as a "first vessel"), signal sources 32, source cables 30, paravanes 14, and streamers 20. (Streamers 20 are shown truncated at the bottom of FIG. 1.) Survey vessel 10 may be configured to move along a surface of body of water 11 such as a lake, sea, ocean, or other water body. In the illustrated embodiment, survey vessel 10 tows streamers 20, signal sources 32, and paravanes 14, which may be used to provide a desired amount of spread among streamers 20. In other embodiments, streamers 20 may be towed by a separate vessel (not shown), rather than survey vessel 10 that tows signal sources 32.

Streamers 20 may include sensors 22 (e.g., hydrophones, geophones, etc.). Streamers 20 may further include streamer steering devices 24 (also referred to as "birds") which may provide selected lateral and/or vertical forces to streamers 20 as they are towed through the water, typically based on wings or hydrofoils that provide hydrodynamic lift. Streamers 20 may further include tail buoys (not shown) at their respective back ends. System 100 further includes chase vessel 16 (also referred to as a "second vessel"), which may be used to maintain (e.g., clean, service, or repair) selected elements of system 100 (e.g., streamers 20) as needed. For example, sections of a streamer 20 may be replaced, or auxiliary equipment may be replaced. Chase vessel 16 may include devices to allow streamers 20 to be lifted out of the water as desired.

Survey vessel 10 may include equipment, shown generally at 12 and for convenience collectively referred to as a "recording system." Recording system 12 may include devices such as a data recording unit (not shown separately) for making a record of signals generated by various geophysical sensors. Recording system 12 may also include navigation equipment (not shown separately), which may be configured to control, determine, and record the geodetic positions of: survey vessel 10, signal sources 32, streamers 20, sensors 22, etc. As illustrated in FIG. 1, streamers 20 are coupled to survey vessel 10 via cables 18.

It is noted that in some embodiments, sensors such as hydrophones and/or geophones may be deployed at locations along the water bottom instead of (or possibly in addition to) being deployed along streamers 20. For example, such bottom-deployed sensors may include ocean-bottom node (OBN) devices and/or ocean-bottom cable (OBC) devices (also referred to in the art as "nodes on a rope"). That is, it is entirely possible to conduct a multi-source geophysical survey without the use of streamers, or by using streamers in combination with bottom-deployed sensors. Sensor data from bottom-deployed sensors may be transmitted wirelessly (either from individual sensors or from one or more transmission points coupled to the sensors) to a vessel that tows signal sources 32 or to a different vessel. Such sensor data may also be stored within the sensors or other bottom-deployed equipment for access when the equipment is retrieved.

In some embodiments, a geophysical data product may be manufactured according to techniques described in this disclosure. A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the geophysical data product. In other instances, as noted above, the data may first be digitized and/or conditioned prior to being stored in the geophysical data product. In yet other instances, the data may be fully processed into a two- or three-dimensional map of the various geophysical structures, or another suitable representation, before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured (or remanufactured) subsequent to survey completion, e.g., during the course of analysis of the survey.

In various embodiments, the survey data ultimately recorded by recording system 12 may not necessarily include every observation captured by sensors 22 (e.g., the raw sensor data may be filtered before it is recorded). Also, in some embodiments, the survey data may include data that is not necessarily indicative of subsurface geology, but may nevertheless be relevant to the circumstances in which the survey was conducted (e.g., environmental data such as water temperature, water current direction and/or speed, salinity, etc.).

Geodetic position (or "position") of the various elements of system 100 may be determined using various devices, including navigation equipment such as relative acoustic ranging units and/or global navigation satellite systems (e.g., a global positioning system (GPS)).

Each of signal sources 32 may include sub-arrays of multiple individual signal sources. For example, a signal source 32 may include a plurality of air guns, marine vibrators, or other seismic sources. In various embodiments, a geophysical survey system may include any appropriate number of towed signal sources 32 and streamers 20. In particular, it is noted that any suitable number of signal sources 32 may be deployed, and some of these may be towed by vessels other than survey vessel 10. Moreover, it is noted that in various embodiments, a "source" as used in the multi-source survey discussion below may include: an array of individual signal sources; one or more individual elements of an array of signal sources; or multiple individual elements of different arrays of signal sources. That is, a "source" may correspond to an individual signal source or to various combinations of signal sources, variously distributed.

To perform a multi-source survey, signal sources 32 may be successively fired using controlled, randomized dithering times, and the resulting data recorded by recording system 12 may include overlapping energy from multiple sources. Numerous configurations of multi-source surveys are possible. Examples may be found in, e.g., Vaage, "Method and system for acquiring marine seismic data using multiple seismic sources," U.S. Pat. No. 6,906,981; Baardman et al, "Method and system for separating seismic sources in marine simultaneous shooting acquisition," U.S. Pat. No. 9,945,972; van Borselen, R. and Baardman, R. H., "Separating sources in marine simultaneous shooting acquisition—method & applications," $82^{nd}$ SEG Technical Program, Expanded Abstracts, 1-5 (2012); and Long, A., "Source and streamer towing strategies for improved efficiency, spatial sampling and near offset coverage," First Break 35(11), 71-74 (2017).

Generally speaking, multi-source surveys may present a variety of advantages relative to single-source surveys. Multi-source surveys may improve operational efficiency, for example by collecting a greater volume of data per unit of survey time, and may offer improved data sampling in terms of fold, azimuth, and/or offset distributions. On the other hand, in the recorded data, the various sources tend to interfere with one another; from the perspective of one source, energy from other sources is effectively noise. The extent to which the benefits of a multi-source survey can be realized generally depends on how effectively the overlapping energy in the recorded data can be separated into individual sources via deblending. It is noted that while the deblending techniques described below are applicable to marine-acquired multi-source seismic survey data, they are in no way restricted to such data, and may also be applied to terrestrial (e.g., land-based) multi-source seismic survey data.

Deblending Workflow for Multi-Source Seismic Survey Data

Figure 2:
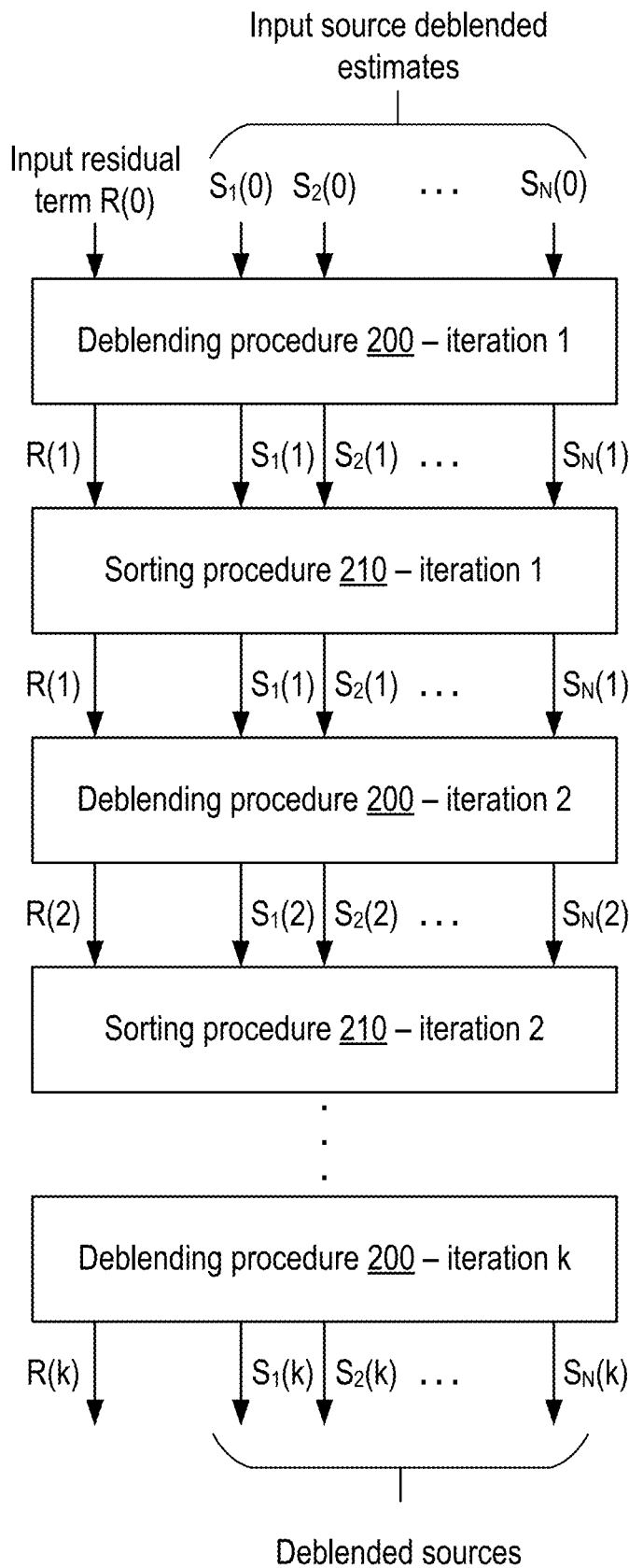
FIG. 2 is a data flow diagram illustrating an embodiment of an iterative, cascaded deblending workflow for multi-source seismic survey data.

FIG. 2 is a data flow diagram that illustrates, in general terms, an embodiment of an iterative, cascaded deblending workflow for multi-source seismic survey data. Additional details regarding a particular implementation of this workflow are discussed below with respect to FIG. 3.

Prior to the operations shown in FIG. 2, multi-source seismic survey data may be collected, resulting in recorded data that includes blended records of seismic data having overlapping energy from different ones of a number of seismic sources. In some embodiments, the blended records of seismic data may include continuously recorded seismic data. The energy from one or more secondary sources may be incoherent in at least one domain relative to the primary source, which may in turn facilitate the deblending of the primary source from the one or more secondary sources using the techniques discussed below. In some embodiments, incoherence of the secondary sources may result from actuating a plurality of sources at randomized intervals. In other embodiments, this incoherence may result from naturally occurring phenomena. For example, in some circumstances, variations in water currents, sea conditions, water temperature, or other environmental conditions may provide sufficient naturally occurring dither to facilitate deblending even without the use of randomized source firing intervals.

Before deblending is performed, the recorded data may initially be aligned to a particular one of the sources, which may be designated the "primary source." (If the recorded data is lengthy, deblending may be performed on selected segments of data, such as 10-20 second segments. As used herein, "recorded data" encompasses both an entire set of survey data and a selected segment of survey data.) Once the recorded data has been so aligned, the remaining sources may be designated "secondary sources." From the perspective of the primary source in a blended set of data, the secondary sources generally represent sources of noise or interference.

In some embodiments, aligning the recorded data to the primary source may be performed on a trace-by-trace basis with respect to the activation time of the primary source. Such alignment may be performed by applying a time shift to a time domain representation of the trace data. In some embodiments, however, alignment may be performed in the frequency domain (e.g., by applying a Fourier transform such as a fast Fourier transform (FFT) or discrete Fourier Transform (DFT), applying a phase shift in the frequency domain, and then applying an inverse Fourier transform to recover the time domain representation). Performing alignment in the frequency domain may facilitate alignment in circumstances where the desired time shift is not an integer multiple of the sample rate (e.g., in circumstances where resampling may be needed).

Returning to FIG. 2, during a first iteration, a deblending procedure 200 receives an initial input residual term R(0) along with a set of input source deblended estimates $S_1(0) \ldots S_N(0)$. Deblending procedure 200 may be performed on groups of traces that have been sorted according to a selected domain in which the secondary source(s) are incoherent with respect to the primary source, as discussed in greater detail below. By convention, it is assumed that for any iteration i, $S_1(i)$ refers to the primary source and $S_2(i) \ldots S_N(i)$ refer to the secondary sources of a total of N sources, although it is understood that any source may be designated the primary source, and any total number of sources may be employed. In some embodiments, prior to the first iteration of deblending procedure 200, the initial values of the input source deblended estimates $S_1(0) \ldots S_N(0)$ are set to a null value (e.g., 0) while the initial input residual term R(0) is set to the recorded data, aligned to the primary source as mentioned above, where the secondary source(s) in the aligned data are incoherent with respect to the primary source. That is, prior to deblending, the blended survey data may be assigned entirely to the residual term R(0), and no part of the blended survey data may be attributed to input source deblended estimates $S_1(0) \ldots S_N(0)$. Other input configurations prior to the first deblending iteration are possible, however.

Once the first iteration of deblending procedure 200 is performed, it produces output residual term R(1) as well as output source deblended estimates $S_1(1) \ldots S_N(1)$. Further details of embodiments of deblending procedure 200 are discussed below, but at a general, intuitive level of understanding, deblending procedure 200 may be understood to extract blended source energy represented in input residual term R(0) and disambiguate that blended energy, assigning components of it to output source deblended estimates $S_1(1) \ldots S_N(1)$. In general, after the first iteration of deblending procedure 200, some degree of blended energy from input residual term R(0) may remain; this remaining energy is assigned to output residual term R(1).

As a practical matter, multiple iterations of deblending procedure 200 may be necessary in order to achieve a desired quality of deblending. As shown in FIG. 2, however, before a second iteration of deblending procedure 200 is performed, a sorting procedure 210 is first applied to residual term R(1) and source deblended estimates $S_1(1) \ldots S_N(1)$. As noted above, prior to the first iteration, the recorded data was first sorted with respect to a primary source, rendering the secondary sources incoherent (e.g., randomized) with respect to the primary source. There are multiple possible data sorting domains that render secondary sources incoherent with respect to a primary source, however. Improved deblending arises when multiple sorting domains are alternated or rotated prior to each successive iteration of deblending procedure 200. Accordingly, after a given iteration of deblending procedure 200, sorting procedure 210 re-sorts the data output by deblending procedure 200 according to a different domain than was used prior to the given iteration.

As used herein, "sorting" seismic data refers to creating trace gathers of the seismic data according to a particular sorting domain. For example, an individual seismic trace can be identified according to a shot number S and a receiver number R (or a channel number in some embodiments), and may also be associated with other information such as one or more spatial coordinates. Thus, a set of traces may be denoted $S_iR_j$, where i denotes the shot number from 1 to I and j denotes the receiver (or channel) number from 1 to J. Sorting this set of traces according to the common shot domain gathers together traces that have a common shot number, resulting in gathers of the form $S_1R^*, S_2R^*, \ldots S_IR^*$, where R* denotes all receiver numbers for which traces exist for a given shot number. By contrast, sorting this set of traces according to the common receiver domain gathers together traces that have a common receiver number, resulting in gathers of the form $S^*R_1, S^*R_2, \ldots S^*R_J$, where S* denotes all shot numbers for which traces exist for a given receiver number. The number of traces included in each gather resulting from a given sort may vary according to the manner in which the traces are distributed relative to the various possible dimensions.

To achieve alternation, a practical minimum for the number of sorting domains is two; in this case, the domains may be alternated after successive applications of deblending procedure 200. Any suitable number of domains may be employed according to any suitable sequence or scheme, however. For example, the order in which domains are employed may be consistent or variable, and it is not required that different domains be used an equivalent number of times. Examples of domains that may be employed include a common channel domain, a common receiver domain, a common midpoint domain, a common depth point domain, or any domain that is orthogonal to a shot domain. Multiple orthogonal domains in the context of a common receiver gather may also be employed as sorting domains. In the context of node-based sensor systems that are deployed in an array or grid (such as OBN/OBC systems as well as land-based sensor arrays), subline and cross-line domains defined with respect to the sensor array may further be employed as sorting domains.

Returning to FIG. 2, once sorting procedure 210 has been applied to the outputs of the first iteration of deblending procedure 200, a second iteration of deblending procedure 200 is performed, producing output residual term R(2) as well as output source deblended estimates $S_1(2) \ldots S_N(2)$. Sorting procedure 210 may be applied to these outputs as well, according to a different domain than was used during the previous iteration. This procedure of deblending and sorting may continue for any suitable number of iterations. In some embodiments, the iterations may continue until the energy of the residual term R(i) satisfies a convergence criterion (e.g., is less than or possibly equal to a threshold level). For example, in an ideal deblending scenario, all energy in the residual term would eventually be attributed to the source deblended estimates, and the resultant residual term would be zero. It may not be practical or necessary to iterate to this point, however; in various embodiments, a nonzero convergence criterion for termination of the deblending procedure may be chosen based on factors such as desired result quality and computation time. In other embodiments, different criteria may be employed to determine when to discontinue iterating. For example, a fixed number of iterations may be chosen a priori. As another example, iteration may continue until the aggregate or individual changes in the output source deblended estimates fall below a threshold value, indicating that these estimates are no longer being substantially updated as iteration proceeds.

FIG. 2 shows that an arbitrary number of iterations k may occur. Following iteration k, the output deblended estimates $S_1(k) \ldots S_N(k)$ represent the deblended version of the original recorded data. That is, individual ones of $S_1(k) \ldots S_N(k)$ represent recorded data that is primarily attributable to respective sources 1 to N. As shown in FIG. 2, following the final iteration of deblending procedure 200, application of sorting procedure 210 may be omitted for efficiency, although it could be included without detrimental effect. That is, performing a sort after a final instance of deblending may have no practical effect on the results, and may be included or omitted in various implementations.

It is noted that, depending on the deblending techniques used and the requirements of downstream analysis procedures, any given one of deblended records $S_1(k) \ldots S_N(k)$ may include some amount of energy present from other sources, which may manifest as some degree of noise or interference. That is, successful deblending does not require perfect isolation of sources. Suppression of incoherent sources below a suitable noise tolerance is often entirely sufficient.

Figure 3:
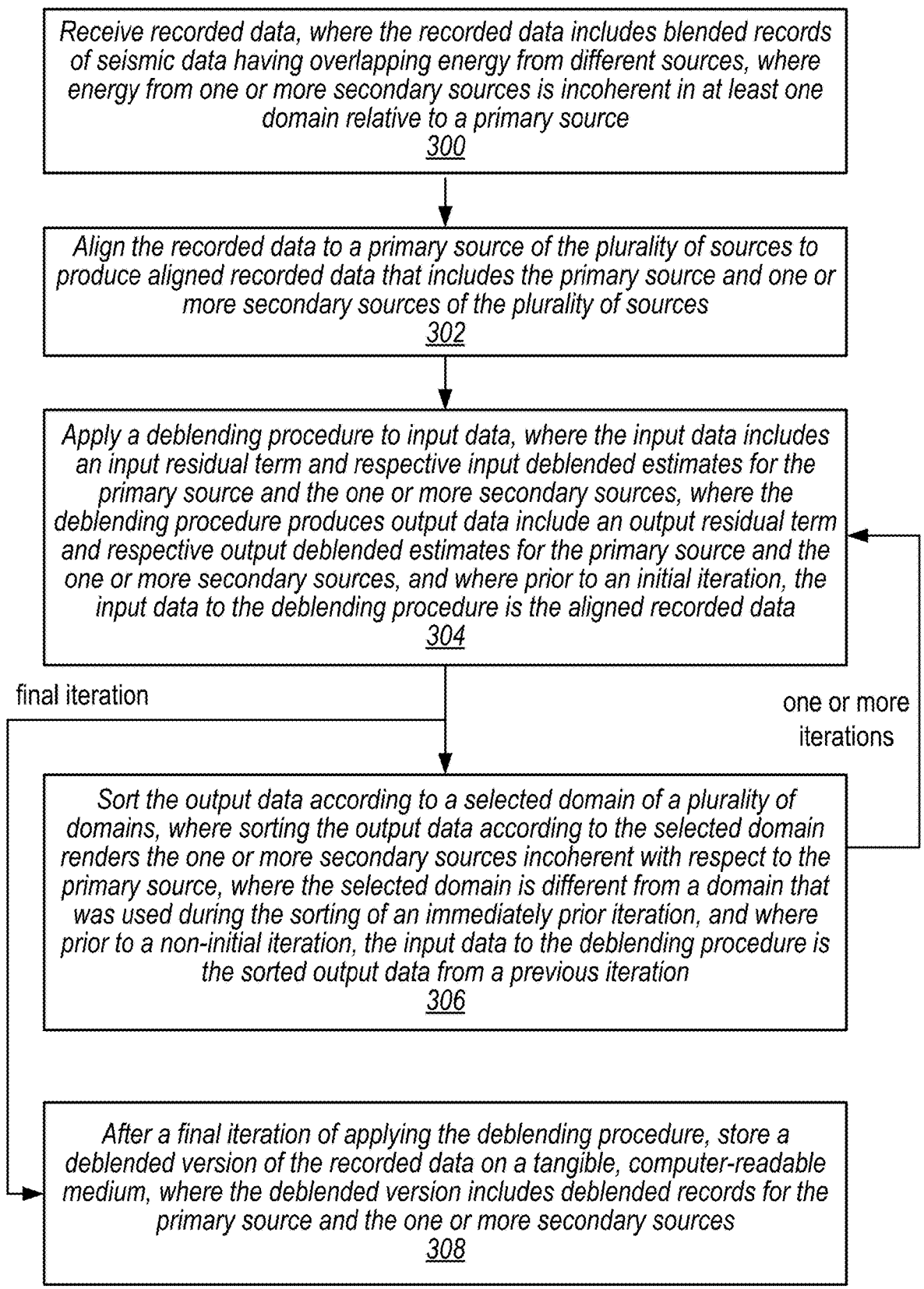
FIG. 3 is a flow chart illustrating a version of the deblending procedure of FIG. 2.

FIG. 3 is a flow chart that illustrates a version of the deblending procedure of FIG. 2 in greater detail. Operation begins in block 300 with receiving recorded data, where the recorded data includes blended records of seismic data having overlapping energy from different sources of a plurality of sources, where energy from one or more secondary sources is incoherent in at least one domain relative to a primary source. As noted above with respect to FIG. 2, the recorded data may include continuously recorded seismic data and/or data acquired with a plurality of sources fired at randomized intervals. For example, the recorded data may have been obtained according to a multi-source survey as discussed with respect to FIG. 1, or another suitable configuration. It is noted that while real-time deblending is not precluded, the recorded data need not be "received" directly from the survey vessel or its various sensors; that is, deblending could occur well after the survey, and the recorded data may be "received" from a storage device.

In block 302, the recorded data is aligned to a primary source of the plurality of sources to produce aligned recorded data that includes the primary source and one or more secondary sources of the plurality of sources. Alignment may occur, for example, according to any of the techniques discussed above with respect to FIG. 2. As noted with respect to FIG. 2, the choice of primary source may be arbitrary, in that the particular choice of primary source may not affect the final deblending results. In some embodiments, alignment of the recorded data may include sorting the recorded data according to a domain that renders the one or more secondary sources incoherent with respect to the primary source.

One or more iterations of blocks 304-306 are then performed. In block 304, a deblending procedure is applied to input data, where the input data includes an input residual term and respective input deblended estimates for the primary source and the one or more secondary sources. Further, the deblending procedure produces output data including an output residual term and respective output deblended estimates for the primary source and the one or more secondary sources. Prior to an initial iteration, the input data to the deblending procedure is the aligned recorded data. Thus, for example, block 304 is similar to the application of deblending procedure 200 of FIG. 2. Moreover, in some embodiments as discussed above, prior to the initial iteration, the aligned recorded data may be assigned to the input residual term, and the respective input deblended estimates for the primary source and the one or more secondary sources may be set to a null value.

In block 306, the output data is sorted according to a selected domain of a plurality of domains, where sorting the output data according to the selected domain renders the one or more secondary sources incoherent with respect to the primary source. Additionally, prior to a non-initial iteration, the input data to the deblending procedure is the sorted output data from a previous iteration. Thus, for example, block 306 is similar to the application of sorting procedure 210 of FIG. 2. As shown in FIG. 2, the input for the initial iteration of the deblending procedure is the aligned recorded data, whereas in subsequent iterations, the input to the deblending procedure is the sorted output of a previous iteration (e.g., the immediately preceding iteration).

Moreover, in block 306, the selected domain is different from a domain that was used during the sorting of an immediately prior iteration. As used herein, for a domain to be "different from a domain that was used during the sorting of an immediately prior iteration" means that the same domain is not used for sorting during two consecutive iterations; however, a domain may be reused for sorting in non-consecutive iterations. As discussed with respect to FIG. 2, the domains may include a common channel domain, a common receiver domain, a common midpoint domain, a common depth point domain, or any domain that is orthogonal to a shot domain. As before, in systems that employ an array of node-based sensors such as OBN/OBC systems, the sorting domains may include subline and cross-line domains defined with respect to the sensor array.

In block 308, after a final iteration of applying the deblending procedure, a deblended version of the recorded data is stored on a tangible, computer-readable medium, where the deblended version includes deblended records for the primary source and the one or more secondary sources. For example, the recorded data may be stored on a magnetic, optical, or nonvolatile storage medium, or any of the examples of a computer-readable medium discussed below with respect to FIG. 12. As discussed above with respect to FIG. 2, various criteria may be employed to control how many iterations are performed; for example, in some embodiments, iteration may continue until the residual term satisfies a convergence criterion. Moreover, it is noted that after a final iteration of applying the deblending procedure, the sorting at block 306 may be omitted.

Figure 4:
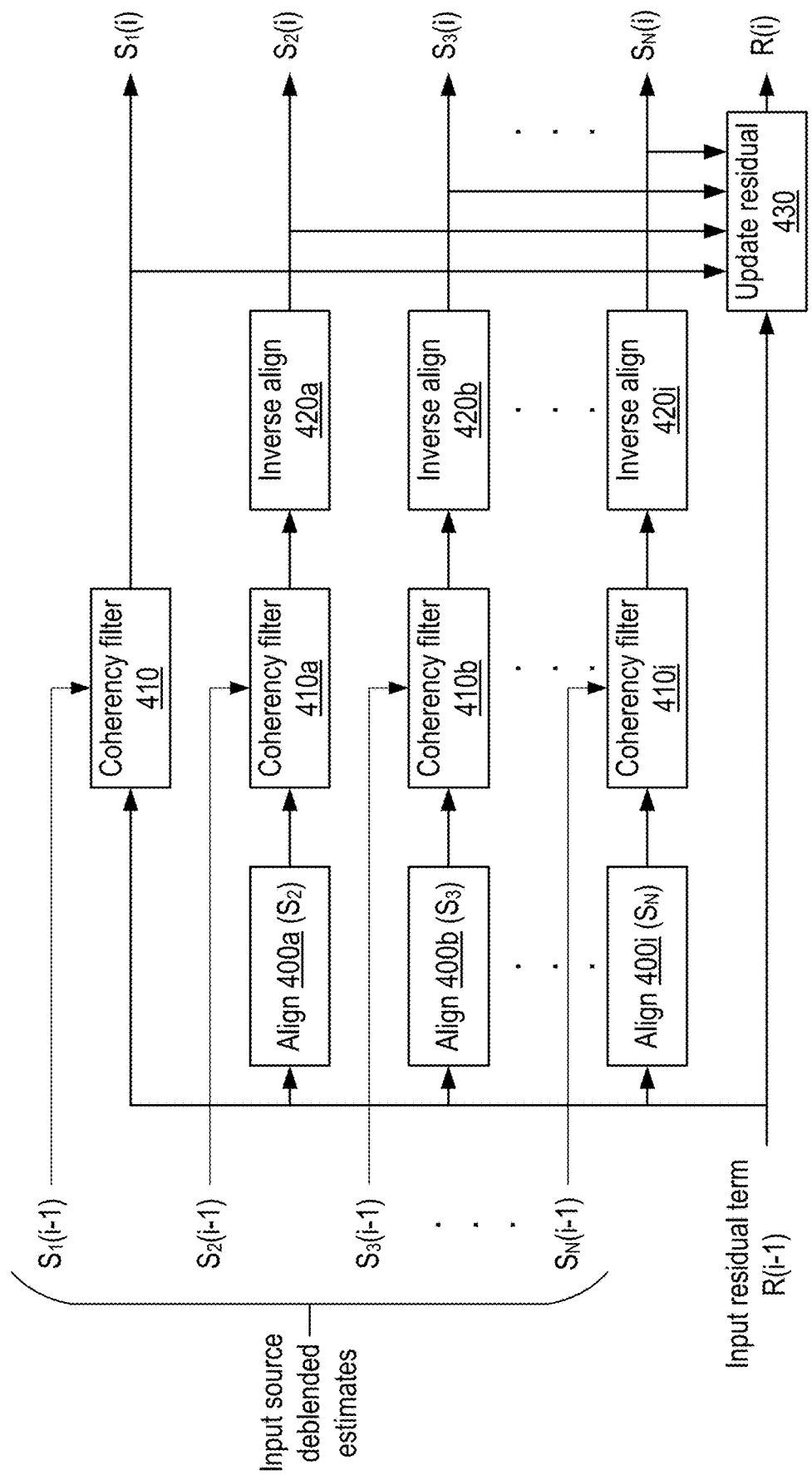
FIG. 4 is a data flow diagram illustrating a particular implementation of a deblending procedure.

As discussed in more detail with respect to FIGS. 4-5, in some embodiments, the deblending procedure of block 304 and 200 may include applying a coherency filter to the input residual term and the respective input deblended estimates for the primary source and the one or more secondary sources. Such coherency filters may include two-dimensional (fxprojection) or three-dimensional (fxyprojection) projection filtering. Examples of two-dimensional and three-dimensional projection filtering may be found, for example, in Soubaras, R., "Signal-preserving random noise attenuation by the f-x projection," 64th SEG Annual International Meeting, Expanded Abstracts, 1576-1579 (1994); Soubaras, R., "3D projection filtering for noise attenuation and interpolation," 70th SEG Annual International Meeting, Expanded Abstracts, 2096-2099 (2000); and Chen, K. and Sacchi, M., "Making f-x projection filters robust to erratic noise," 84th SEG Annual International Meeting, Expanded Abstracts, 4371-4375 (2014). It is noted, however, that in various embodiments, two-dimensional or three-dimensional wavelet thresholding, two-dimensional or three-dimensional curvelet thresholding, or dimension reduction may be employed to perform coherency filtering. In some embodiments, applying the coherency filter may include estimating one or more coefficients of the coherency filter from the respective input deblended estimates for the primary source and the one or more secondary sources instead of from the input residual term. Estimating filter coefficients from a current estimate of the deblended sources rather than from the residual term may also be referred to as "guided filtering."

Deblending using Coherency Filtering

FIG. 4 is a data flow diagram illustrating a particular implementation of deblending procedure 200. For a given iteration i, the illustrated embodiment takes input data that includes an input residual term R(i−1) and input deblended estimates $S_1(i-1) \ldots S_N(i-1)$ corresponding to N sources. That is, the input values are taken from a previous iteration, or in the case where the given iteration is an initial iteration, the input values may be taken from the original recorded data. Generally speaking, any number of sources may be employed, although deblending performance may be improved if the number of sources is limited to fewer than, e.g., 10.

As discussed above, $S_1$ is designated the primary source by convention, although any of the sources may be designated as the primary source. In FIG. 4, applying deblending procedure 200 to generate the output deblended estimate $S_1(i)$ for the primary source includes applying coherency filter 410 to the input residual term R(i−1) and the input deblended estimate $S_1(i-1)$ for the primary source.

For the input deblended estimates of the one or more secondary sources $S_2(i-1) \ldots S_N(i-1)$, the input residual term R(i−1) is aligned to a respective secondary source as shown in alignment procedures 400a-i. That is, for secondary source $S_2$, input residual term R(i−1) is aligned to $S_2$, for secondary source $S_3$, input residual term R(i−1) is aligned to $S_3$, and so forth. Generally speaking, for a given secondary source, input residual term R(i−1) is aligned to the given secondary source. As noted above, alignment may be performed by using, e.g., either time domain or frequency domain techniques.

After alignment, for a given secondary source, a coherency filter is applied to the aligned input residual term and the input deblended estimate for the given secondary source, as shown at coherency filters 410a-i. Subsequently, alignment to the given secondary source is removed from the output of the coherency filter, as shown in inverse alignment procedures 420a-i. As noted above, prior to deblending, the input residual term was aligned to a given secondary source. Generally speaking, then, the effect of removing alignment to the given secondary source in procedures 420a-i is to restore the alignment of the coherency filter output to primary source $S_1$. The result of this operation produces output deblended estimates for the one or more secondary sources $S_2(i) \ldots S_N(i)$. It is noted that removing alignment to the given secondary source may be performed using operations complementary to the original alignment, and may be performed in the time or frequency domain in a manner similar to the original alignment.

Additionally, output residual term R(i) is generated by update residual procedure 430. In some embodiments, output residual term R(i) may be generated by subtracting, from input residual term R(i−1), the respective output deblended estimates for the primary source $S_1(i)$ and the one or more secondary sources $S_2(i) \ldots S_N(i)$. This may be performed in any suitable fashion, e.g., by summing the output deblended estimates and then subtracting this sum, by serially subtracting the output deblended estimates, etc. As used herein in relation to generating the output residual term, "subtracting" refers to any suitable operation that removes from the input residual term a representation of seismic energy encoded in one or more of the output deblended estimates. Depending on how this information is encoded, "subtracting" may involve simple scalar subtraction, vector subtraction, or more complex operators.

It is noted that in some embodiments, aligning the input deblended estimate and removing the alignment (e.g., at elements 400a-i and 420a-i) may be performed in a time domain, whereas applying the coherency filter (e.g., at elements 410, 410a-i) may be performed in a frequency domain. Accordingly, appropriate transform operations (e.g., a Fast Fourier Transform (FFT) and its inverse) may be performed at suitable points along the data flow shown in FIG. 4. In other embodiments, however, the illustrated procedures may be performed entirely in a time domain, a frequency domain, or another suitable domain. For example, both alignment and coherency filtering could be performed in a frequency domain.

It is further noted that in the configuration shown in FIG. 4, generation of the output deblended estimate for primary source $S_1(i)$ is asymmetric with respect to the output deblended estimates for the one or more secondary sources $S_2(i) \ldots S_N(i)$: for the secondary sources, alignment and removal of alignment procedures are performed, whereas these are not shown for the primary source. This is because if all data is originally aligned to the primary source prior to a deblending iteration, as is assumed for the illustrated embodiment, it is not necessary to align the input residual value to the primary source and then invert this alignment, because such alignment would have no practical effect. Omitting alignment-related operations for the primary source case may thus improve deblending performance to some degree. Nevertheless, in some embodiments, FIG. 4 could be modified to add procedures for performing alignment and removal of alignment for the primary source, rendering this path symmetric to the secondary source paths. In some cases, regularizing the deblending procedure in this manner may help facilitate parallelization of the process for execution on parallel computing resources.

As to parallelization, while the arrangement shown in FIG. 4 suggests the possibility for concurrent processing of primary and secondary sources in parallel, the illustrated workflow may also be performed serially or in any suitable order. For example, in one implementation, each source may be deblended sequentially (e.g., progressing from left to right across FIG. 4 in rows) whereas in another implementation, individual stages of deblending may be applied to all sources before the next stage is applied (e.g., progressing from top to bottom across FIG. 4 in columns).

Figure 5B:
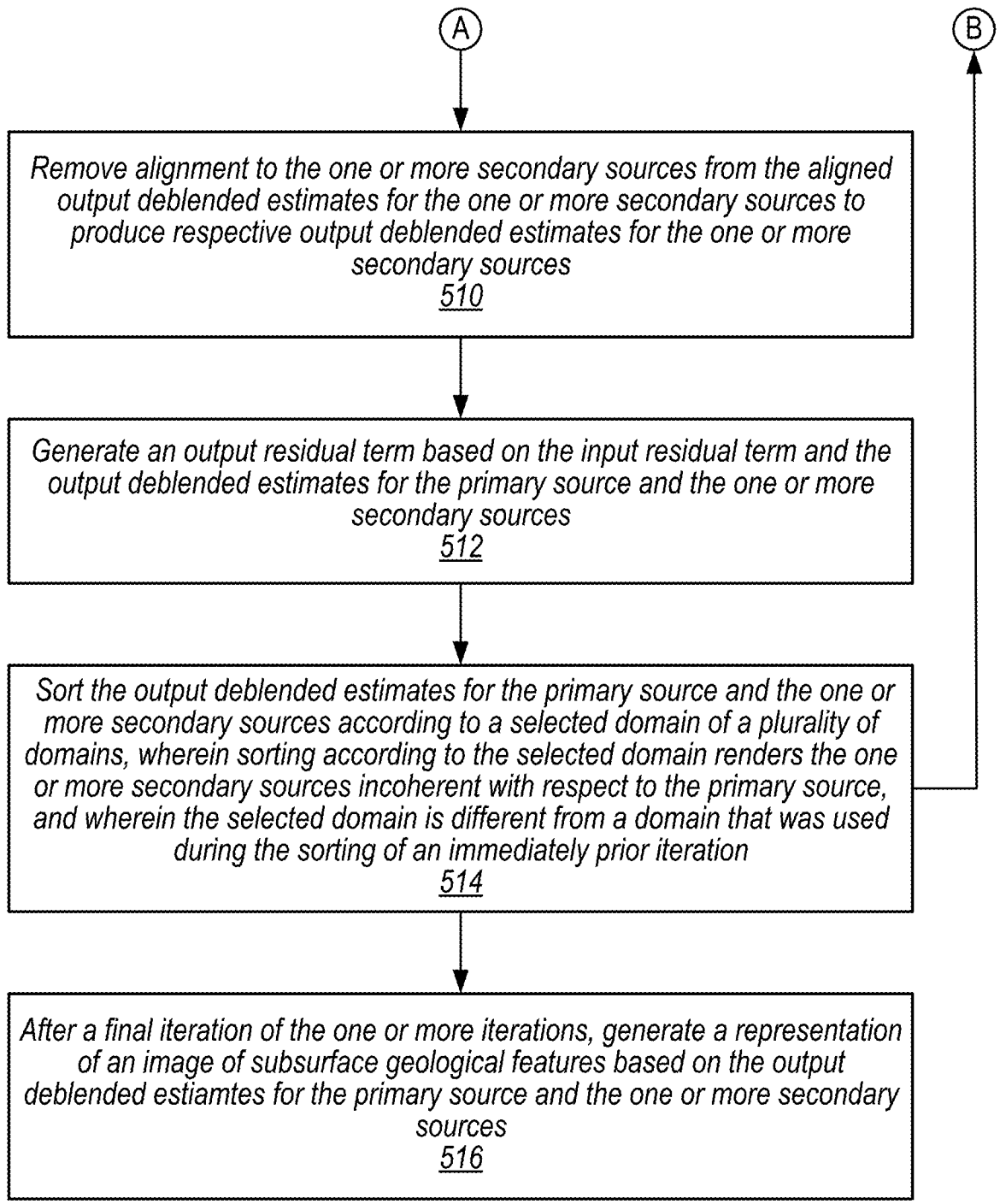

FIGS. 5A-B show a flow chart that illustrates in greater detail a method for producing an image of subsurface geological features based upon the deblending procedure shown in FIG. 4. Operation begins in block 500 where recorded data that includes blended records of seismic data having overlapping energy from different sources of a plurality of sources, where energy from one or more secondary sources is incoherent in at least one domain relative to a primary source. For example, as noted previously, the recorded data may include continuously recorded seismic data and/or data acquired with a plurality of sources fired at randomized intervals, as discussed above. At block 502, the recorded data is aligned to a primary source of the plurality of sources to produce aligned recorded data that includes the primary source and one or more secondary sources of the plurality of sources. One or more iterations of blocks 504-514 are then performed.

At block 504, an output deblended estimate for the primary source is generated based on an input deblended estimate for the primary source and an input residual term. In some embodiments, this may include applying a coherency filter to the input residual term and the input deblended estimate for the primary source to produce the output deblended estimate for the primary source, where applying the coherency filter occurs without aligning the input residual term, as discussed above and shown in FIG. 4. In other embodiments, as discussed above, generating the output deblended estimate for the primary source may include performing similar alignment and removal of alignment procedures as are performed for secondary sources.

At block 506, the input residual term is aligned to the one or more secondary sources to produce one or more aligned versions of the input residual term that correspond respectively to the one or more secondary sources.

At block 508, a coherency filter is applied to the one or more aligned versions of the input residual term and respective input deblended estimates for the one or more secondary sources to produce respective aligned output deblended estimates for the one or more secondary sources. As noted previously, in various embodiments, applying the coherency filter may include applying two-dimensional or three-dimensional projection filtering, or applying one or more of two-dimensional or three-dimensional wavelet thresholding, two-dimensional or three-dimensional curvelet thresholding, or dimension reduction. In some embodiments, applying the coherency filter may further include estimating one or more coefficients of the two-dimensional or three-dimensional projection filtering (or any of the other techniques just mentioned) from the respective input deblended estimates for the primary source and the one or more secondary sources instead of from the input residual term. That is, "guided filtering" may be performed, as discussed above.

At block 510, alignment to the one or more secondary sources is removed from the aligned output deblended estimates for the one or more sources to produce respective output deblended estimates for the one or more secondary sources.

At block 512, an output residual term is generated based on the input residual term and the output deblended estimates for the primary source and the one or more secondary sources.

At block 514, the output deblended estimates for the primary source and the one or more secondary sources are sorted according to a selected domain of a plurality of domains, where sorting according to the selected domain renders the one or more secondary sources incoherent with respect to the primary source, and where the selected domain is different from a domain that was used during the sorting of an immediately prior iteration. As discussed above with respect to FIGS. 2-3, sorting domains may be alternated or rotated in any suitable fashion. In some embodiments, the output residual term may be included in the sorting of the output deblended estimates. As also discussed above, in some embodiments, iteration of blocks 506-514 may continue until the output residual term satisfies a convergence criterion.

At block 516, after a final iteration of the one or more iterations, a representation of the image of subsurface geological features may be generated based on the output deblended estimates for the primary source and the one or more secondary sources. For example, the resulting representation may illustrate various arrangements of geological layers and may facilitate the identification of possible hydrocarbon or other deposits within those features. As noted above, in some embodiments, sorting of the output deblended estimates may be omitted during a final iteration.

Deblending using Signal-to-Noise Metric

Simultaneous multi-source data that includes blended energy from multiple sources can present a variety of noise processing challenges. The statistics for blending noise may deviate from common Gaussian assumptions, which in turn may decrease the efficacy of coherency filtering and increase cross-talk noise in the deblended data. In some embodiments, the deblending procedures discussed above may be further improved by generating a signal-to-noise metric for the input deblended estimates for the primary source and the one or more secondary sources, and then scaling a contribution of the coherency filter based on the signal-to-noise metric. Generally speaking, the results of such scaling may operate to increase the effect of the coherency filter when the signal-to-noise metric indicates that the signal is relatively strong compared to noise, and to decrease the effect of the coherency filter when the signal-to-noise metric indicates that the data is overly noisy. In some embodiments, the signal-to-noise metric may be used as a proportional weight for the coherency filter. In other embodiments, the signal-to-noise metric may be tested against a tolerance value, and the coherency filter may be conditionally applied (e.g., either applied or not applied, in a binary fashion) based on whether the signal-to-noise metric satisfies the tolerance value. It is noted that in various embodiments, the effect of the coherency filter may depend on multiple factors. For example, the signal-to-noise metric may vary according to frequency or other parameters, and the effect of the coherency filter likewise may vary adaptively according to such parameters.

Figure 6:
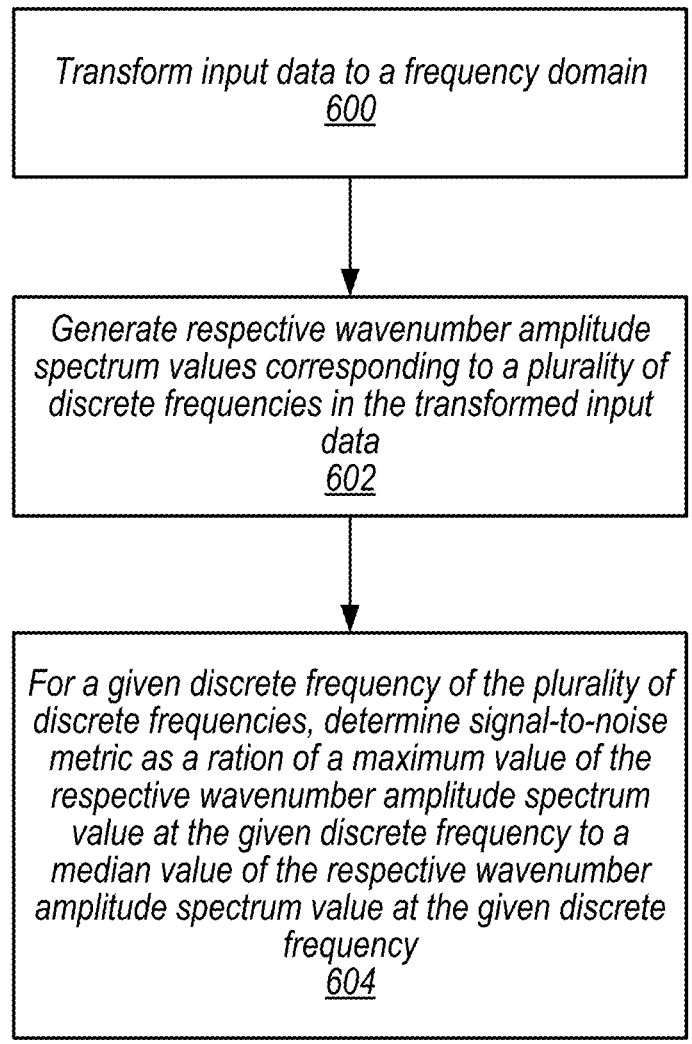
FIG. 6 is a flow chart illustrating an embodiment of a method of generating a signal-to-noise metric for use in deblending.

FIG. 6 illustrates one example of a method of generating a signal-to-noise metric for use in conjunction with the coherency filtering techniques described above. Operation begins in block 600 where the input data for deblending is transformed into a frequency domain. For example, if the data in a given two-dimensional time domain window is expressed as $D(x, t)$, then a complex-to-real Fourier transform may be applied to this data to obtain the frequency domain representation D(x, f).

At block 602, respective wavenumber amplitude spectrum values are generated corresponding to a plurality of discrete frequencies in the transformed input data. For example, D(x, f) may include a number of discrete frequencies. For each of i discrete frequencies, and all spatial samples at a given frequency, a complex-to-complex Fourier transform may be applied to $D(x, f_i)$ to obtain a wavenumber representation $D(k, f_i)$. From each $D(k, f_i)$, an amplitude spectrum value $A(k_j)$ (a real vector) may be computed, which represents the wavenumber amplitude spectrum value for a given discrete frequency.

At block 604, for a given discrete frequency of the plurality of discrete frequencies, the signal-to-noise metric for the given discrete frequency is determined as a ratio of a maximum value of the respective wavenumber amplitude spectrum value at the given discrete frequency to a median value of the respective wavenumber amplitude spectrum value at the given discrete frequency. For example, the maximum and median values of $A(k_j)$ may be determined, and the ratio of these may be given as the signal-to-noise metric. In some cases, noise may exhibit frequency dependence, e.g., may be stronger at higher frequencies than lower frequencies.

Although the foregoing discussion is given in terms of the two-dimensional case, it may be readily generalized to the three-dimensional case, where D(x, y, t) is transformed to D(x, y, f) and further to $D(k_x, k_y, f_i)$. It is also noted that in various embodiments, the signal-to-noise metric may be generated in the time or image domain.

Generalized Deblending Procedure using Objective Function

The various aspects of deblending discussed above may be expressed in general form as an optimization problem involving coherency constraints in a domain where the energy from secondary sources appears as incoherent blending noise with respect to a primary source. The impulsive nature of the blending noise, along with its potentially non-Gaussian statistics, can introduce crosstalk into the deblending result that may be difficult to eliminate using conventional coherency filtering without the use of post-deblending filtering stages.

The techniques discussed herein propose a multi-domain iterative method for deblending multi-source seismic data. Generally speaking, the method inverts for the sources by minimizing an objective function (e.g., a least squares cost function, as discussed below) with coherency constraints. The coherency measure may be based on the spatial quasi-predictability of seismic events in the frequency domain. Different spatial dimensions may be considered in cascade to thoroughly examine potential coherency in the data. In order to address the impulsive characteristics of crosstalk noise, the coherency measure may be modified as discussed below to account for instances of poor signal-to-noise metrics.

More specifically, in one embodiment, the generalized deblending procedure disclosed herein may be implemented by solving a minimization of an objective function in the frequency-space domain. Assume that a single frequency slice of the blended seismic data is denoted by $D=(d_1, \ldots, d_N)$ where N denotes the number of spatial traces in the processing window. The objective function for deblending may then be formulated as follows:

$$\min_{S_k}\left( \left\| D - \sum_{k=1}^{K} H_k S_k \right\|_2^2 + \sum_{k=1}^{K} \mu_k \|A_k S_k\|_2^2 \right)$$

Here, k denotes the index of a particular source out of K total sources to be estimated. $H_k$ denotes a diagonal matrix representing the time shift in the frequency domain subject to the time dither of the $k^{th}$ source $S_k$. $A_k$ denotes a projection error fitting matrix associated with $S_k$ (e.g., as discussed in the Chen and Sacchi reference mentioned above). Finally, $\mu_k$ denotes a "robustness scalar" that expresses the relationship of signal and noise in the data. For example, $\mu_k$ may be a version of the signal-to-noise metric discussed in the previous section.

Qualitatively speaking, to relate the objective function to the various embodiments discussed above, the left-hand difference term of the objective function may be considered to be a residual term, whereas the right-hand term may be considered to be a coherency filter term. In various implementations, $\mu_k$ may operate as a numerical weight or a binary threshold value that scales the effect of coherency filtering according to the signal-to-noise characteristics of the data.

A numerical solution to the objective function presented above may be achieved using an iterative algorithm that includes an estimation phase to generate the coefficients of the coherency filter from the current deblended estimate for the multiple sources, and a prediction phase to update the deblended estimates for the sources according to the objective function. In the case where projection filtering is used for coherency filtering, an example of estimation of the projection filter coefficients may be found in Sacchi, M. D. and Kuehl., "ARMA formulation of FX prediction error filters and projection filters," *Journal of Seismic Exploration*, 9(3), 185-197 (2001). In some embodiments, $\mu_k$ may be updated after each iteration using a signal-to-noise metric based on the wavenumber contents at various frequency slices, for example as discussed above with respect to FIG. 6. Following each iteration, the data may be sorted according to different domains as discussed with respect to FIGS. 2-5, so that consecutive iterations are not sorted according to the same domain. Iteration may proceed until the residual term has been reduced to a satisfactory amount.

Figure 7:
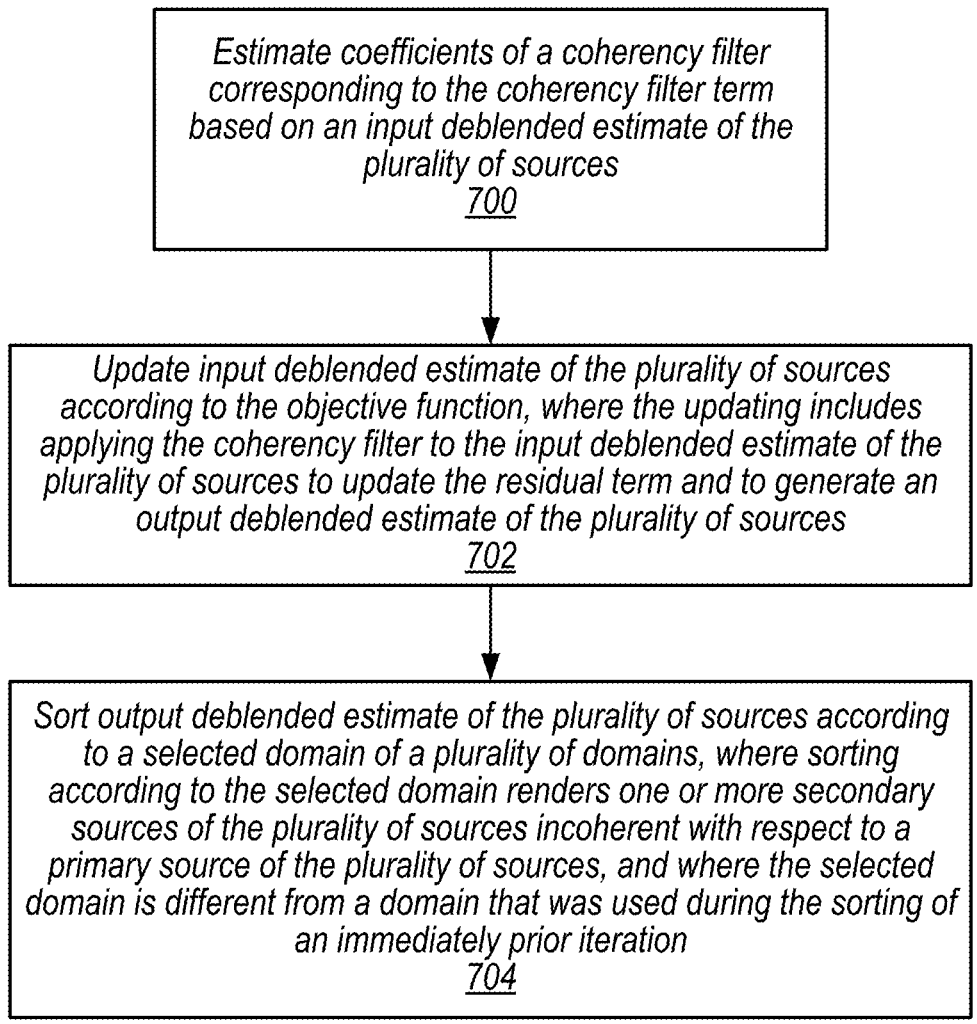
FIG. 7 is a flow chart illustrating an embodiment of a method of iteratively minimizing an objective function in a frequency-space domain to generate deblended seismic data.

FIG. 7 is a flow chart illustrating an example of a method of iteratively minimizing an objective function in a frequency-space domain to generate deblended seismic data, where the objective function includes a residual term and a coherency filter term, such as the objective function given above. Operation begins in block 700 with estimation of coefficients of a coherency filter corresponding to the coherency filter term of the objective function, based on an input deblended estimate of the plurality of sources.

At block 702, the input deblended estimate of the plurality of sources is updated according to the objective function, where the updating includes applying the coherency filter to the input deblended estimate of the plurality of sources to update the residual term and to generate an output deblended estimate of the plurality of sources. In some embodiments, updating the input deblended estimate may include generating a signal-to-noise metric of the input deblended estimate, and scaling a contribution of the coherency filter to the objective function according to the signal-to-noise metric, where the contribution of the coherency filter increases as noise indicated by the signal-to-noise metric decreases.

At block 704, the output deblended estimate is sorted according to a selected domain of a plurality of domains, where sorting according to the selected domain renders one or more secondary sources of the plurality of sources incoherent with respect to a primary source of the plurality of sources, and where the selected domain is different from a domain that was used during the sorting of an immediately prior iteration.

Blocks 700-704 may be iteratively repeated, for example until the residual term satisfies a convergence criterion (not shown).

In various embodiments, it is noted that any of the embodiments shown in FIG. 2-5 or 7 may correspond to a means for iteratively deblending recorded seismic data, where the means for iteratively deblending alternates deblending of data and sorting of data according to a selected domain of a plurality of domains, where the selected domain is alternated or rotated among the plurality of domains during successive iterations.

Deblending Examples

Figures 8A, 8B:
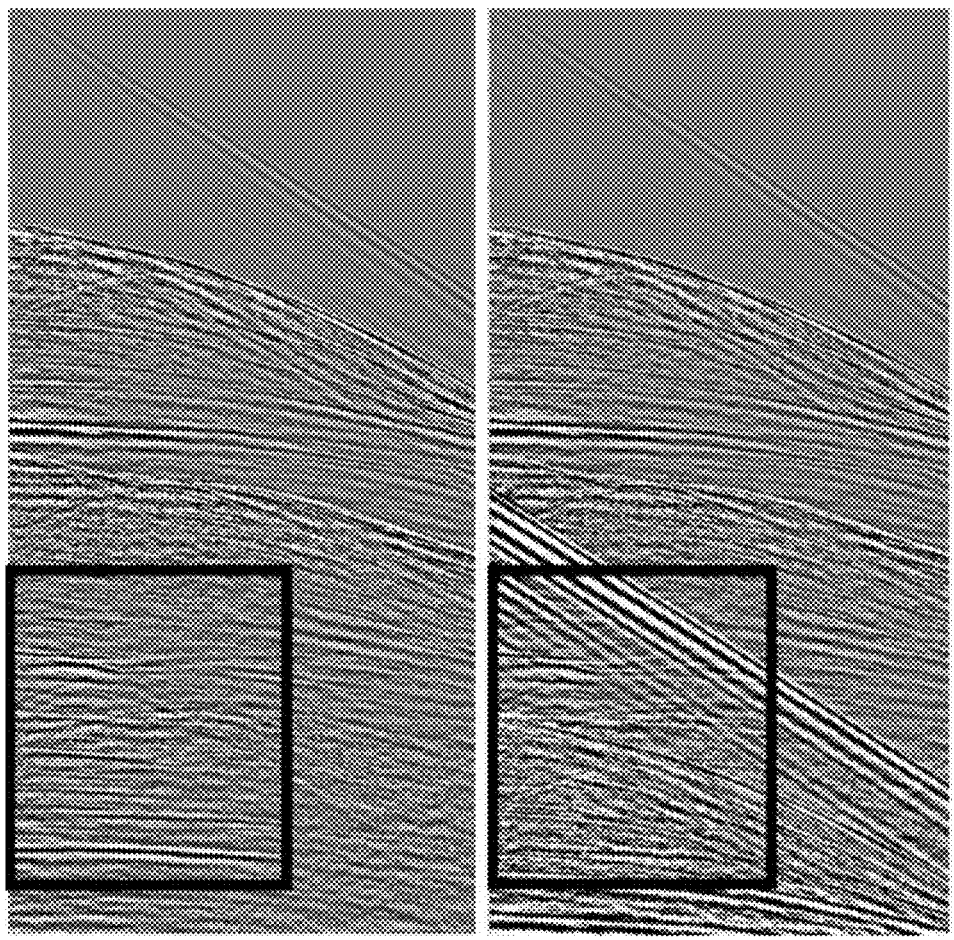
FIGS. 8A-B illustrate original survey data and simulated multi-source data generated from the original survey data.
Figure 8C:
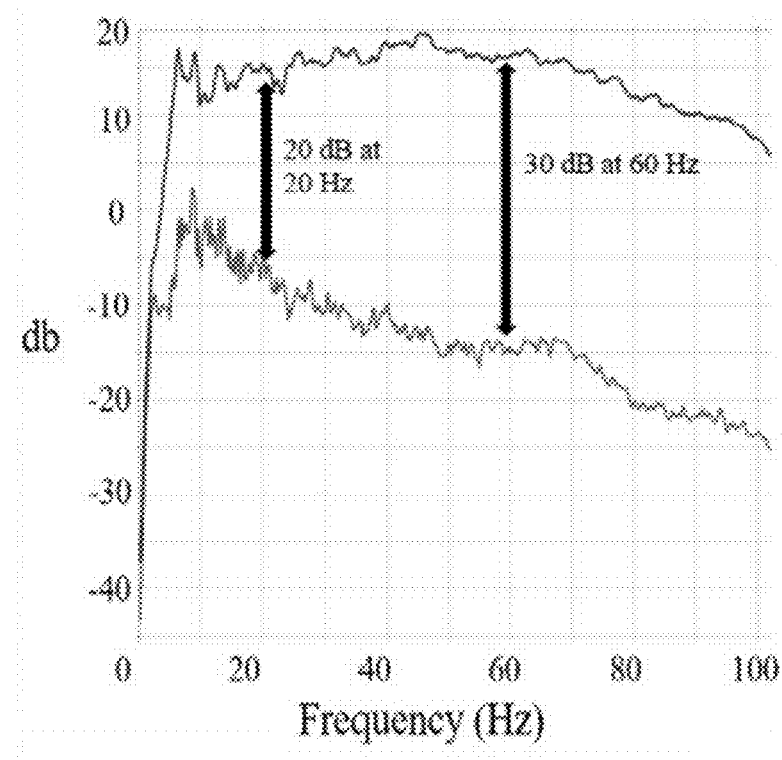
FIG. 8C illustrates amplitude spectra for a selected region of FIGS. 8A-B.

A version of the deblending methodology discussed above has been tested on actual survey data that was numerically blended to simulate a three-source acquisition. (That is, original survey data was modified to synthetically generate blended-source artifacts approximating those that would have been present in an original three-source data set.) Specifically, data from a 3D survey in the Potiguar Basin, northeast of Brazil, was used as the original reference data, and is shown in FIG. 8A. To generate the synthetic blended data shown in FIG. 8B, the shot record of FIG. 8A was numerically blended with a dithered consecutive shot record using a dither time table from a three-source survey. The resultant data simulates the challenging deblending issues related to deep-water simultaneous triple-source acquisition. FIG. 8C shows the amplitude spectra for the highlighted region in FIG. 8A-B. In this zone, the signal energy to blending energy ratio is typically about −30 dB at 60 Hz to −20 dB at 20 Hz.

Figure 9C:
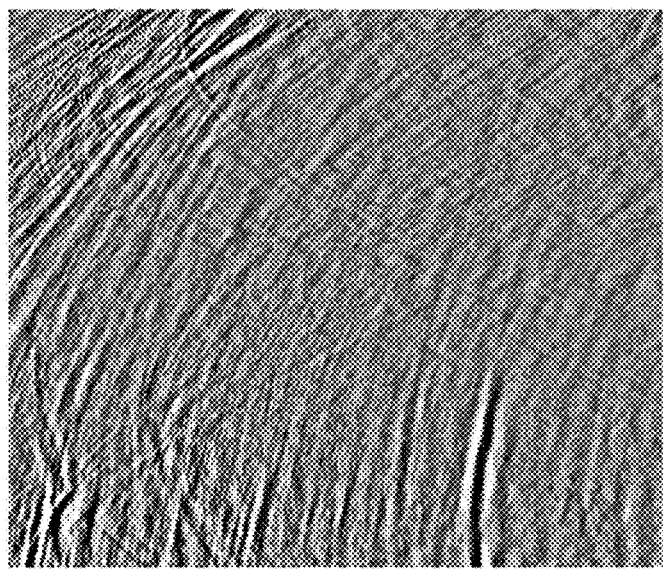
FIG. 9C shows a reference result for this region.
Figure 9B:
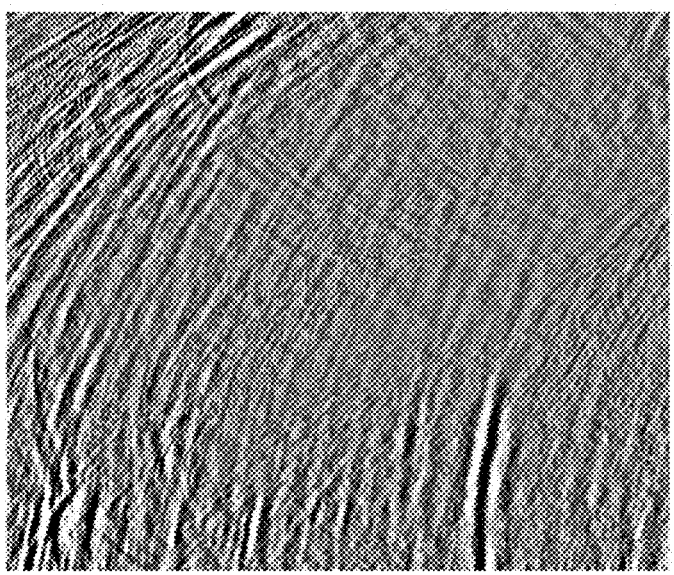
FIGS. 9A-B illustrate a magnified region of FIG. 8B before and after deblending.
Figure 9A:
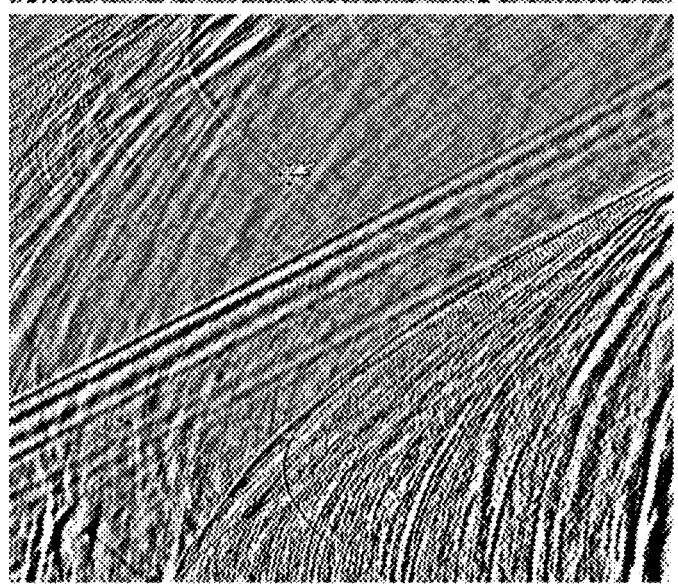

FIGS. 9A and 9B illustrate a magnified version of the data inside the black box of FIG. 8B before and after applying the deblending procedure. For comparison, FIG. 9C represents the corresponding region of the original data in FIG. 8A, which is the desired result. Before deblending, as shown in FIG. 9A, the blending noise is orders of magnitude stronger than the signal. The deblending procedure gradually attenuates the crosstalk energy to the level of the background noise over the course of several iterations, driving the blended estimates towards the desired solution. As can be seen in FIGS. 9B-C, the deblending procedure effectively recovers the unblended reference data.

Figure 10A:
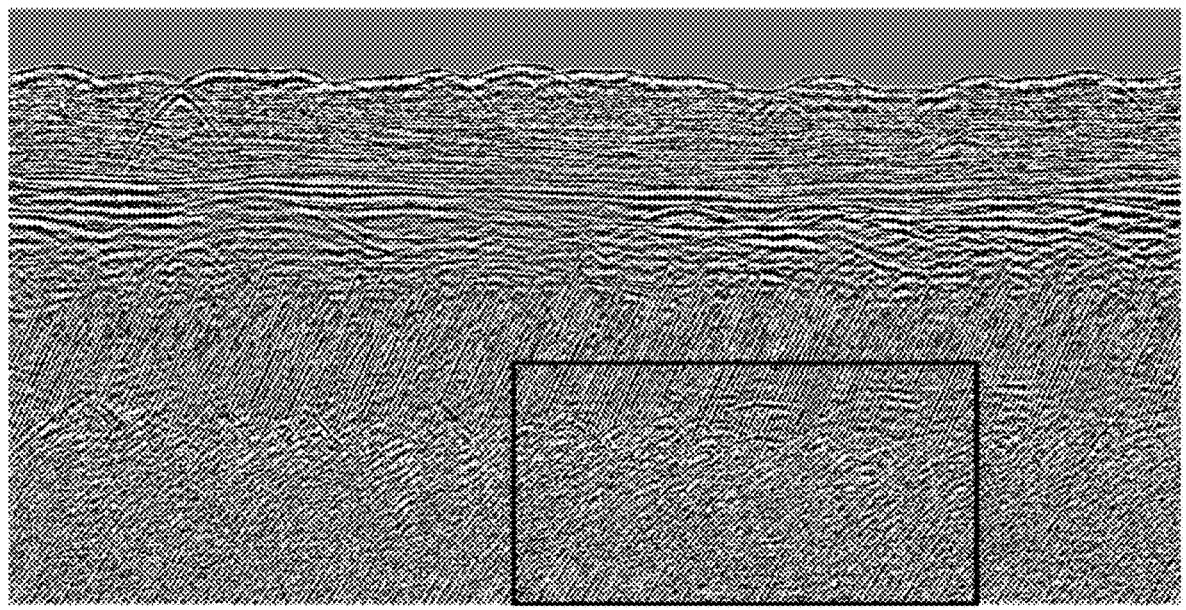
FIGS. 10A-B illustrate the blended raw data and the deblended result data in stacked form.
Figure 10B:
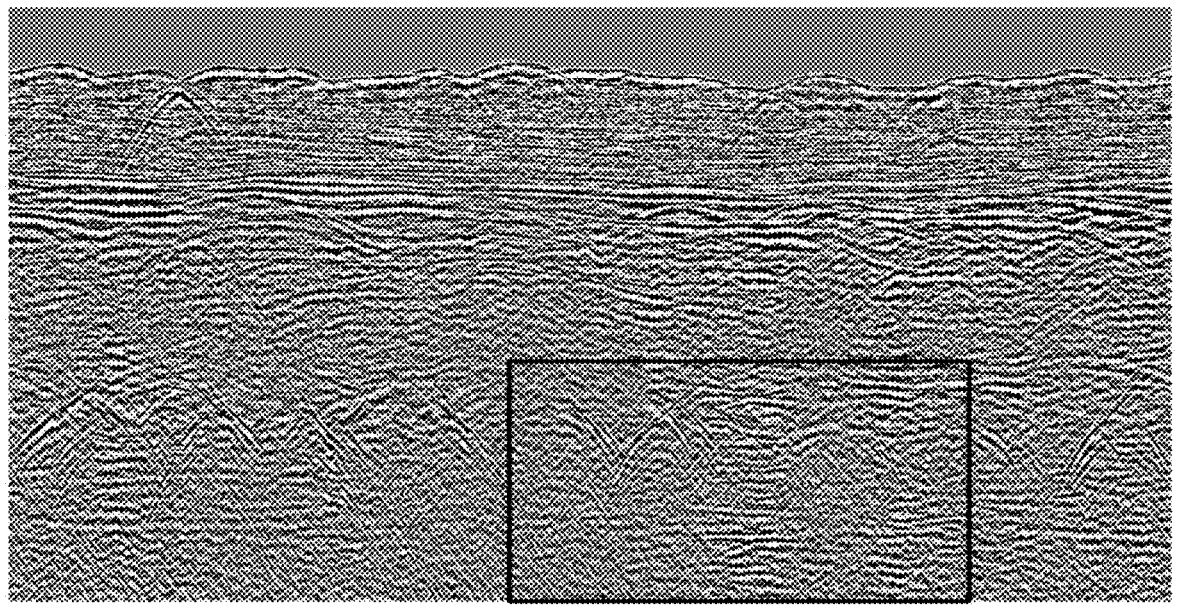
Figures 11A, 11B:
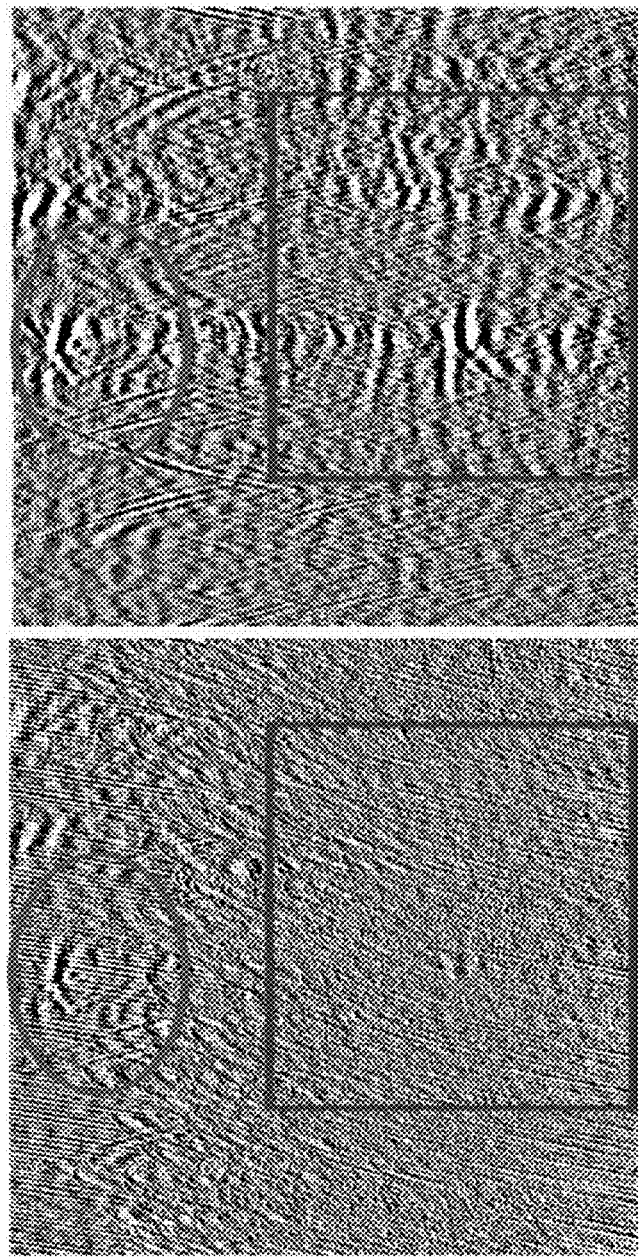
FIGS. 11A-B illustrate magnified views of a selected region of FIGS. 10A-B.
Figure 11C:
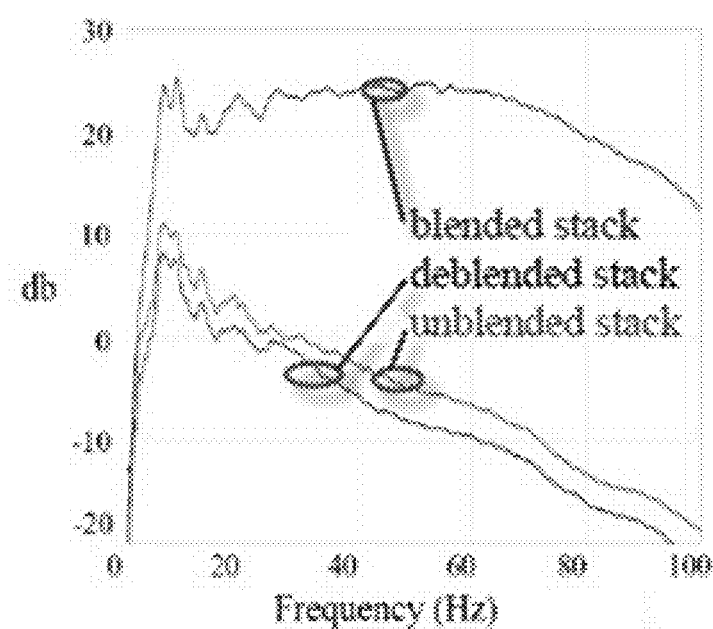
FIG. 11C illustrates amplitude spectra for the blended stack, the deblended stack, and a reference stack.

To further illustrate the performance of the deblending procedure, the blended raw data and the deblended result data are stacked as shown in FIGS. 10A-B, respectively. Following deblending, the blending noise associated with the direct arrival of the subsequent source energy is removed, with the signal well preserved. The highlighted section of FIGS. 10A-B represents a region of particularly strong interference. Magnified views of these regions are shown in FIGS. 11A-B, respectively. In the shallow section (denoted by ellipses), one might carefully observe the signal hidden behind the overlapping shot energy even before the deblending, whereas for the region with a strong energy overlap (denoted by boxes), the deblending procedure effectively removed the crosstalk and retrieved the underlying hidden signal, which is very weak compared to the overlapping energy. FIG. 11C shows the spectrum analysis for the blended stack of FIG. 11A, the deblended stack of FIG. 11B, and a stack of the original, unblended data (the reference result). As can be seen here, the data before deblending is dominated by strong blending noise representing the primary reflections from subsequent shots. After deblending, the amplitude spectrum becomes more balanced, particularly at low frequencies, and its shape is nearly identical to the reference result.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 12:
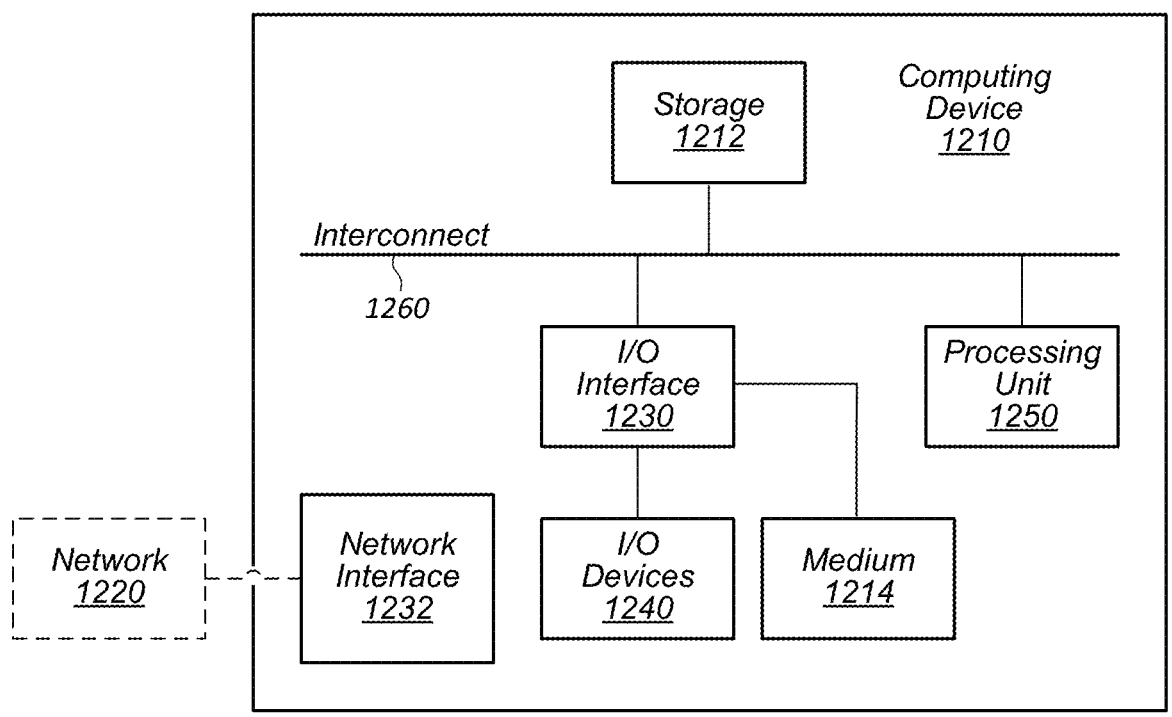
FIG. 12 shows a block diagram illustrating an example computing system.

Turning now to FIG. 12, a block diagram of an example computing device (which may also be referred to as a computing system) 1210 is depicted, according to some embodiments. Computing device 1210 may be used to implement various portions of this disclosure. Computing device 1210 is one example of a device that may be used as a mobile device, a server computing system, a client computing system, a distributed computing system, or any other computing system implementing portions of this disclosure. It is noted that in various configurations, computing system 1210, when programmed to perform a specific algorithm, may constitute a means for performing a function for which the specific algorithm is a corresponding structure.

Computing device 1210 may be any suitable type of device, including, but not limited to, a personal computer system, desktop computer, laptop or notebook computer, mobile phone, mainframe computer system, supercomputer, web server, workstation, or network computer. As shown, computing device 1210 includes processing unit 1250, storage subsystem 1212, and input/output (I/O) interface 1230 coupled via interconnect 1260 (e.g., a system bus). I/O interface 1230 may be coupled to one or more I/O devices 1240. Computing device 1210 further includes network interface 1232, which may be coupled to network 1220 for communications with, for example, other computing devices. Other bus architectures and subsystem configurations may also be employed.

As described above, processing unit 1250 includes one or more processors. In some embodiments, processing unit 1250 includes one or more coprocessor units. In some embodiments, multiple instances of processing unit 1250 may be coupled to interconnect 1260. Processing unit 1250 (or each processor within processing unit 1250) may contain a cache or other form of on-board memory. In some embodiments, processing unit 1250 may be implemented as a general-purpose processing unit, and in other embodiments it may be implemented as a special purpose processing unit (e.g., an ASIC). In general, computing device 1210 is not limited to any particular type of processing unit or processor subsystem.

Storage subsystem 1212, which may encompass system memory and/or virtual memory, is usable by processing unit 1250 (e.g., to store instructions executable by and data used by processing unit 1250). Storage subsystem 1212 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1212 may consist solely of volatile memory in some embodiments. Storage subsystem 1212 may store program instructions executable by computing device 1210 using processing unit 1250, including program instructions executable to cause computing device 1210 to implement the various techniques disclosed herein. In at least some embodiments, storage subsystem 1212 and/or medium 1214 may represent an example of a non-transitory computer-readable or machine-readable medium that may store executable instructions.

In the illustrated embodiment, computing device 1210 further includes non-transitory computer-readable medium 1214 as a possibly distinct element from storage subsystem 1212. As shown, computer-readable medium 1214 is configured as a peripheral or I/O device accessible via I/O interface 1230, although other interconnect configurations are possible. In various embodiments, non-transitory medium 1214 may include persistent, tangible storage such as disk, nonvolatile memory, tape, optical media, holographic media, or other suitable types of storage. In some embodiments, non-transitory medium 1214 may be employed to store and transfer geophysical data, and may be physically separable from computing device 1210 to facilitate transport. Accordingly, in some embodiments, the geophysical data product discussed above may be embodied in non-transitory medium 1214. Although shown to be distinct from storage subsystem 1212, in some embodiments, non-transitory medium 1214 may be integrated within storage subsystem 1212. Embodiments of non-transitory medium 1214 and/or storage subsystem 1212 may correspond to a means for storing recorded seismic data, and may also correspond to a means for storing a deblended version of the recorded; these means may be distinct structures or may correspond to the same structure.

I/O interface 1230 may represent one or more interfaces and may be any of various types of interfaces configured to couple to and communicate with other devices, according to various embodiments. In some embodiments, I/O interface 1230 is a bridge chip from a front-side to one or more back-side buses. I/O interface 1230 may be coupled to one or more I/O devices 1240 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1240.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to traverse a streamer" is intended to cover, for example, a mechanism that performs this function during operation, even if the mechanism in question is not currently being used (e.g., a power supply is not connected to it, or no streamer is currently present). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. Only those claims expressly using the "means for [performing a function]" construct are intended to invoke Section 112(f) for that claim element.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A method, comprising:
accessing seismic recordings comprising blended receiver traces, wherein each of the blended receiver traces contains energy from multiple seismic sources; and
generating multiple sets of deblended receiver traces, wherein each of the multiple sets of deblended receiver traces corresponds to a different one of the multiple seismic sources; and
recording the multiple sets of deblended receiver traces in at least one non-transitory computer readable medium;
wherein generating the multiple sets of deblended receiver traces comprises iteratively applying a coherency filter to estimated sets of deblended receiver traces and updating a residual until a termination condition is reached; and
wherein applying the coherency filter to the estimated sets of deblended receiver traces during a current iteration comprises determining coefficients of the coherency filter based on estimated sets of deblended receiver traces from an immediately prior iteration.

2. The method of claim 1:
wherein a primary one of the estimated sets of deblended receiver traces corresponds to a primary source and the other estimated sets of deblended receiver traces comprise secondary estimated sets of deblended receiver traces, each of which corresponds to a respective secondary source; and
further comprising, after each but a final iteration, applying a sorting procedure to the receiver traces in each of the estimated sets of deblended receiver traces, according to a current iteration sorting domain, such that each of the secondary estimated sets of deblended receiver traces is rendered incoherent relative to the primary source.

3. The method of claim 2, wherein:
during each iteration, the current iteration sorting domain employed by the sorting procedure is different from a sorting domain that was employed during an immediately prior iteration.

4. The method of claim 1, wherein:
inputs to each iteration of applying the coherency filter comprise an input residual, an input primary source estimate, and input secondary source estimates;
outputs of each iteration of applying the coherency filter comprise an output residual, an output primary source estimate, and output secondary source estimates;
prior to a first iteration, the residual comprises the blended receiver traces aligned to the primary source, and the secondary source estimates are set to null; and
for each non-initial iteration, the input residual comprises the output residual from an immediately prior iteration, the input primary source estimate comprises the output primary source estimate from the immediately prior iteration, and each of the input secondary source estimates comprises a corresponding one of the output secondary source estimates from the immediately prior iteration.

5. The method of claim 4, wherein, during each iteration, and for each of the input secondary source estimates:
before the coherency filter is applied, a source-specific alignment is applied to the input residual to align the input residual with the corresponding secondary source; and
after the coherency filter is applied, the source-specific alignment is reversed from an output of the coherency filter to generate a corresponding output secondary source estimate.

6. The method of claim 5, wherein, during each iteration:
the output residual is generated by subtracting the output primary source estimate and the output secondary source estimates from the input residual.

7. The method of claim 1, wherein:
accessing the seismic recordings comprises cutting individual segments of traces from longer recorded traces; and
generating the multiple sets of deblended receiver traces is performed on the individual segments separately.

8. The method of claim 1, wherein:
the energy from each one of the multiple seismic sources contained in the blended receiver traces exhibits incoherence relative to the energy from each of the other ones of the multiple seismic sources; and
the incoherence results at least in part from actively-introduced randomization of actuations of the multiple seismic sources.

9. The method of claim 1, wherein:
the energy from each one of the multiple seismic sources contained in the blended receiver traces exhibits incoherence relative to the energy from each of the other ones of the multiple seismic sources; and
the incoherence results at least in part from naturally occurring phenomena.

10. The method of claim 1, further comprising, for each iteration:
generating a signal-to-noise metric for each of the input deblended source estimates; and
for each source estimate, scaling a contribution of the coherency filter based on the corresponding signal-to-noise metric.

11. A non-transitory computer-readable medium having program instructions stored therein that, when executed by one or more processors, cause the one or more processor to perform steps comprising:
accessing seismic recordings comprising blended receiver traces, wherein each of the blended receiver traces contains energy from multiple seismic sources; and
generating multiple sets of deblended receiver traces, wherein each of the multiple sets of deblended receiver traces corresponds to a different one of the multiple seismic sources; and wherein generating the multiple sets of deblended receiver traces comprises iteratively applying a coherency filter to estimated sets of deblended receiver traces and updating a residual until a termination condition is reached; and wherein applying the coherency filter to the estimated sets of deblended receiver traces during a current iteration comprises determining coefficients of the coherency filter based on estimated sets of deblended receiver traces from an immediately prior iteration.

12. The medium of claim 11:
wherein a primary one of the estimated sets of deblended receiver traces corresponds to a primary source and the other estimated sets of deblended receiver traces comprise secondary estimated sets of deblended receiver traces, each of which corresponds to a respective secondary source; and further comprising, after each but a final iteration, applying a sorting procedure to the receiver traces in each of the estimated sets of deblended receiver traces, according to a current iteration sorting domain, such that each of the secondary estimated sets of deblended receiver traces is rendered incoherent relative to the primary source.

13. The medium of claim 12, wherein:
during each iteration, the current iteration sorting domain employed by the sorting procedure is different from a sorting domain that was employed during an immediately prior iteration.

14. The medium of claim 11, wherein:
inputs to each iteration of applying the coherency filter comprise an input residual, an input primary source estimate, and input secondary source estimates;

outputs of each iteration of applying the coherency filter comprise an output residual, an output primary source estimate, and output secondary source estimates;

prior to a first iteration, the residual comprises the blended receiver traces aligned to the primary source, and the secondary source estimates are set to null; and for each non-initial iteration, the input residual comprises the output residual from an immediately prior iteration, the input primary source estimate comprises the output primary source estimate from the immediately prior iteration, and each of the input secondary source estimates comprises a corresponding one of the output secondary source estimates from the immediately prior iteration.

15. The medium of claim 14, wherein, during each iteration, and for each of the input secondary source estimates:
before the coherency filter is applied, a source-specific alignment is applied to the input residual to align the input residual with the corresponding secondary source; and after the coherency filter is applied, the source-specific alignment is reversed from an output of the coherency filter to generate a corresponding output secondary source estimate.

16. The medium of claim 15, wherein, during each iteration:

the output residual is generated by subtracting the output primary source estimate and the output secondary source estimates from the input residual.

17. The medium of claim 11, wherein:
accessing the seismic recordings comprises cutting individual segments of traces from longer recorded traces; and generating the multiple sets of deblended receiver traces is performed on the individual segments separately.

18. The medium of claim 11, wherein:
the energy from each one of the multiple seismic sources contained in the blended receiver traces exhibits incoherence relative to the energy from each of the other ones of the multiple seismic sources; and the incoherence results at least in part from actively-introduced randomization of actuations of the multiple seismic sources.

19. The medium of claim 11, wherein:
the energy from each one of the multiple seismic sources contained in the blended receiver traces exhibits incoherence relative to the energy from each of the other ones of the multiple seismic sources; and the incoherence results at least in part from naturally occurring phenomena.

20. The medium of claim 11, further comprising, for each iteration:
generating a signal-to-noise metric for each of the input deblended source estimates; and for each source estimate, scaling a contribution of the coherency filter based on the corresponding signal-to-noise metric.

21. A non-transitory computer-readable medium having program instructions stored therein that, when executed by one or more processors, cause the one or more processor to perform steps comprising:
accessing seismic recordings comprising blended receiver traces, wherein each of the blended receiver traces contains energy from multiple seismic sources; and generating multiple sets of deblended receiver traces, wherein each of the multiple sets of deblended receiver traces corresponds to a different one of the multiple seismic sources; and wherein generating the multiple sets of deblended receiver traces comprises iteratively applying a coherency filter to estimated sets of deblended receiver traces and updating a residual until a termination condition is reached; and wherein applying the coherency filter to the estimated sets of deblended receiver traces during a current iteration comprises applying a 3D projection filter.

22. The medium of claim 21, wherein:
the 3D projection filter comprises an fxy projection filter.

23. The medium of claim 21, wherein:
applying the 3D projection filter to the estimated sets of deblended receiver traces during the current iteration comprises determining coefficients of the 3D projection filter based on estimated sets of deblended receiver traces from an immediately prior iteration.

* * * * *